US008503660B2

(12) United States Patent
Barnett et al.

(10) Patent No.: US 8,503,660 B2
(45) Date of Patent: Aug. 6, 2013

(54) UNIFIED COMMAND AND CONTROL OF A MULTIPLICITY OF HETEROGENEOUS SYSTEMS SUPPORTING CALL CENTER FUNCTIONALITY

(75) Inventors: James Barnett, Auburndale, MD (US); Malcom Strandberg, Cambridge, MA (US); Robert Owens, Franklin, TN (US)

(73) Assignee: Aspect Software, Inc., Chelmsford, MA (US)

( * ) Notice: Subject to any disclaimer, the term of this patent is extended or adjusted under 35 U.S.C. 154(b) by 1428 days.

(21) Appl. No.: 11/851,931

(22) Filed: Sep. 7, 2007

(65) Prior Publication Data

US 2009/0067611 A1 Mar. 12, 2009

(51) Int. Cl.
*H04M 3/00* (2006.01)
*H04M 5/00* (2006.01)

(52) U.S. Cl.
USPC ............ 379/265.01; 379/265.04; 379/265.09; 379/266.01; 379/309

(58) Field of Classification Search
USPC ............. 379/265.01, 265.04, 265.09, 266.01, 379/309
See application file for complete search history.

(56) References Cited

U.S. PATENT DOCUMENTS

| 5,335,268 | A | * | 8/1994 | Kelly et al. | 379/112.05 |
| 5,450,482 | A | * | 9/1995 | Chen et al. | 379/230 |
| 6,724,885 | B1 | * | 4/2004 | Deutsch et al. | 379/265.02 |
| 6,826,194 | B1 | * | 11/2004 | Vered et al. | 370/449 |
| 6,937,715 | B2 | * | 8/2005 | Delaney | 379/265.09 |
| 7,783,030 | B1 | * | 8/2010 | Bruening et al. | 379/266.07 |
| 2006/0146806 | A1 | * | 7/2006 | Khuc et al. | 370/352 |
| 2007/0230683 | A1 | * | 10/2007 | Brown et al. | 379/266.01 |
| 2007/0287430 | A1 | * | 12/2007 | Hosain et al. | 455/414.1 |
| 2010/0246801 | A1 | * | 9/2010 | Sundaram et al. | 379/265.09 |

FOREIGN PATENT DOCUMENTS

| EP | 1246440 A1 | 2/2002 |
| WO | WO98/31130 A1 | 7/1998 |
| WO | WO98/35509 A2 | 8/1998 |
| WO | WO2004/030327 A1 | 8/2004 |

OTHER PUBLICATIONS

British Search Report for related application No. GB0816247.1.

* cited by examiner

*Primary Examiner* — Quynh Nguyen
(74) *Attorney, Agent, or Firm* — Husch Blackwell LLP

(57) ABSTRACT

A method and apparatus are provided for operating a plurality of call center products. The method includes the steps of providing an enterprise administration server and disposing a respective terminal adapter between the enterprise administration server and each of the plurality of call center products. The method further includes the steps of a terminal adapter of a call center of the plurality of call center products receiving a database instruction from the enterprise administration server; the terminal adapter mapping a database instruction between a protocol of the enterprise administration server and a protocol of the call center product and the call center product executing the instruction.

41 Claims, 1 Drawing Sheet

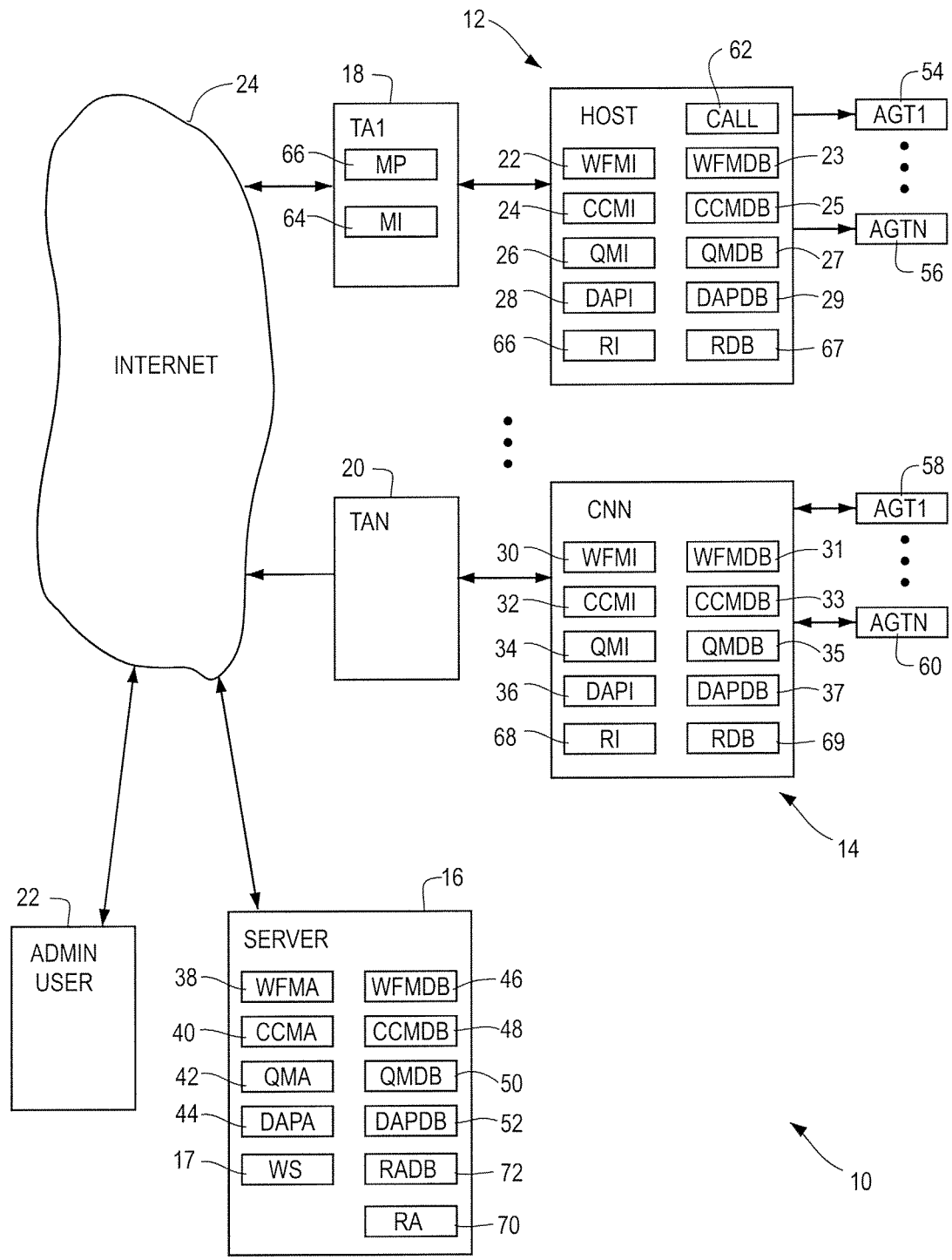

UNIFIED COMMAND AND CONTROL OF A MULTIPLICITY OF HETEROGENEOUS SYSTEMS SUPPORTING CALL CENTER FUNCTIONALITY

FIELD OF THE INVENTION

The field of the invention relates to communication systems and more particularly to contact centers.

BACKGROUND OF THE INVENTION

Call centers are generally known. Call centers are typically used wherever an organization has occasion to handle a multitude of individual contacts with clients. Usually, the organization will hire a number of agents to interact with clients.

Contacts between the organization and clients may be handled under any of a number of different communication mediums. For example, contacts may be initiated through the public switch telephone network (PSTN) by a client calling a telephone number provided by the organization. Alternatively, the organization may place telephone calls to its clients. In either case, connection of the telephone call with an agent may be handled by an automatic call distributor (ACD).

Similarly, contacts with clients through the Internet may be handled by a host of a contact center. Contacts in this case may be handled under a voice format (e.g., VoIP) or under a text format (e.g., e-mail, chat, etc.).

Once a call is detected, the ACD may select an agent to handle the call. The agent may be selected based upon qualifications in handling the type of call involved, based upon experience with the client involved or based upon idle time. Once an agent is selected, the ACD may automatically route the call to a telephone of the selected agent.

As the contact is delivered to the agent, a host of the contact center may retrieve any records associated with previous contacts with the client and deliver those records to the selected agent as a screen pop at the same instant that the contact is delivered. If the host can determine a purpose of the call, the host may also display text on the terminal of the selected agent containing a message to be delivered to the client.

SUMMARY

A method and apparatus are provided for operating a plurality of dissimilar call center products. The method includes the steps of providing an enterprise administration server and disposing a respective terminal adapter between the enterprise administration server and each of the plurality of dissimilar call center products. The method further includes the steps of a terminal adapter of a call center product of the plurality of dissimilar call center products receiving a database instruction from the enterprise administration server, the terminal adapter mapping a database instruction between a protocol of the enterprise administration server and a protocol of the call center product and the call center product executing the instruction.

BRIEF DESCRIPTION OF THE DRAWINGS

FIG. 1 depicts a call center system in accordance with an illustrated embodiment of the invention.

DETAILED DESCRIPTION OF AN ILLUSTRATED EMBODIMENT

While call centers work well, they are constantly evolving and, in some cases, require replacement or expansion. When a call center made by a first call center provider must be replaced or expanded, the organization will often consider and may, in fact, purchase a call center from a competitor for use with existing, legacy call centers because of a lower price.

However, call center products from competitors often do not work well together because of differing operating philosophies, hardware and software. Because of the importance of call centers, a need exists for better method of coordinating the operation of call center products provided by competitors.

FIG. 1 is a block diagram of a call center system shown generally in accordance with an illustrated embodiment of the invention. Included within the call center system is an administration system (admin system) 10 for administering operation of a number of dissimilar call centers 12, 14 of the call center system. While FIG. 1 shows only two call centers 12, 14, it should be understood that the call center system of FIG. 1 may include any number of call centers 12, 14. Moreover, the term "dissimilar call centers" should be understood to mean call centers that do not share the same command and control structure. For example, a First Point Spectrum ACD call center made during the late 1990s does not use the same command and control structure as an Aspect ACD made during the same time period.

Under the embodiment illustrated in FIG. 1, the admin system 10 includes an admin server 16 coupled to the call centers 12, 14 through the Internet 24 and a respective terminal adapter 18, 20. One or more administrative persons (users) working through a terminal (the person and terminal together hereinafter referred to as an "admin user") 22 may access a website 17 of the server 16 through the Internet 24. The operation of the call centers 12, 14 may be controlled through the activities of an administrative user 22 through the server 16. While the admin user 22 and server 16 are shown connected through the Internet 24, the admin user 22 may be co-located and be directly connected to the server 16.

While the call centers 12, 14 may be different in structure and operation, the use of the terminal adapters 18, 20 allows the system of FIG. 1 to be operated as if it were one large call center. Moreover, the server 16 may have a completely different control structure than any of the call centers 12, 14 where there is nothing in common among the call centers 12, 14. This allows the server 16 to operate under a "best of breed" philosophy where the terminal adapters 18, 20 accommodate any differences.

The architecture of the admin system 10 is simple, scalable, and extensible. In simple conceptual terms, the admin system 10 sits on top of existing administrative interface applications and databases of the call centers 12, 14. "Sitting on top of" means that the administrative interfaces and databases of the call centers 12, 14 do not rely upon the admin system 10 for proper operation. The admin system 10 uses the interfaces of the call systems 12, 14 to read data from their databases and to write changes into them, but it does not attempt to replace them. Instead, the admin system 10 acts as a web wrapper, providing a unified view of administrative data, but not requiring any changes to the existing systems 12, 14. As much as possible, admin system 10 simply acts as another client to the current administrative interfaces of the call centers 12, 14, which allows existing administrative tools to continue working independently, particularly in the case where the connection of the call centers 12, 14 with the admin system 10 is lost.

In effect, the admin system 10 controls the call centers 12, 14 by changing the data within the databases of the call centers 12, 14. This has the advantage that the call centers 12, 14 function properly without any other input or control from the admin system 10. If the admin system 10 should malfunction or otherwise become inoperative, then data may be entered directly through existing admin services available within the call centers 12, 14.

Since the server 16 merely changes data within the call centers 12, 14, there is no limit to the number of servers 16 within the system of FIG. 1. While one is shown in FIG. 1, the system of FIG. 1 may contain two or more.

The ability to read data from the call centers 12, 14 allows resources to be shared among call centers 12, 14. For example, the entire list of agents 54, 56, 58, 60 may be visible through the server 16. However, some agents may be better skilled than others. In these cases, some agents may be shared among call center products and centers and some may not be shared.

In general, the call centers 12, 14 may rely upon a number of database interfaces. In one embodiment, five administrative interface applications may be used. The five are: 1) a work force management (WFM) interface 22, 30; 2) a call center management interface 24, 32; 3) a quality management interface 26, 34), 4) a directory access protocol (DAP) interface 28, 36 and 5) a reporting database interface 66, 68. The WFM interface 22, 30 provides access to a WFM database 23, 31 within the call center 12, 14 and is used by a WFM application within the respective call centers 12, 14. The WFM application operates on a first level to maintain a list of signed-in agents and also to predict a work force (e.g., the number of agents) needed during any one time period based upon historical records and current predictions. The WFM may also monitor call queues of each agent group to determine how long calls remain in queue for the group and other statistics about agent performance. Other statistics may include calls per hour, abandoned calls, average call handling time, identifiers of agent groups and an identifier of each agent assigned to each of the identified agent groups.

The call center management interface 24, 32 provides access to a call management database 25, 33 within each respective call center 12, 14. The call management database 25, 33 is used by a call management application to maintain a list of agents and the qualification of each agent. The call management application may also be used to select agents to handle calls based upon any appropriate method (e.g., agent idle time, agent skill, etc.). The call management application may also track agent availability.

The quality management interface 26, 34 provides access to a quality management database 27, 35 within each of the respective call centers 12, 14. The quality management database 27, 35 is used by a quality management application to record calls and other data about call handling by agents.

The directory access protocol interface 28, 36 provides access to a directory access protocol database, 29, 37. The directory access protocol database 29, 37 may be accessed by a lightweight directory access protocol (LDAP) to provide access control to the call centers 12, 14. The directory access protocol database contains a list of users, passwords and access rights of each user.

The reporting interface 66, 68 provides access to a report database 67, 69 (e.g., viewpoint, datamart, etc). The report databases 67, 69 may collect data regarding any of a number of call center operations (e.g., agent performance, call statistics, etc.). Reporting data may be collected from other interfaces 22, 30; 24, 32; 26, 34; 28, 36 or may be generated independently.

Located within the server 16 may be a respective workforce management application (WFMA) 38, a call center management application (CCMA) 40, a quality management application (QMA) 42, a data access protocol application (DAPA) 44 and a reporting application 70. Each of the applications 38, 40, 42, 44, 70 are accessible by the admin user 22 through the website 17. The applications 38, 40, 42, 44, 70 serve at least some of the same function as the respective applications 22, 30; 24, 32; 26, 34; 28, 36; 66, 68 of the call centers 12, 14 except that at least some of the respective applications of the call centers 12, 14 operate under a different protocol than the respective applications 38, 40, 42, 44, 70 of the admin server 16.

The applications 38, 40, 42, 44, 70 of the server 16 differ from the corresponding applications 22, 30; 24, 32; 26, 34; 28, 36; 66, 68 of the call centers 12, 14 in that they operate over a larger database and, therefore, can achieve economies of scale and efficiency that are not possible by the call centers 12, 14 working in isolation. For example, the applications 38, 40, 42, 44, 70 have the ability to handle all calls and all agents as if they were part of a single integrated call center located in a single location. The server 16 is able to accomplish this because it is able to match any call with any agent using methods that are described in more detail below.

In general, access to the call centers 12, 14 by the applications 38, 40, 42, 44, 70 of the server 16 is provided through a respective terminal adapter 18, 20. In each case, instructions from the applications 38, 40, 42, 44, 70 are executed on the call centers 12, 14 by mapping the instructions from the protocol of the server 16 to the respective protocols of the call centers 12, 14 within a mapping processor 66 of the respective terminal adapters 18, 20. Once an instruction from an application 38, 40, 42, 44, 70 has been mapped to the appropriate protocol, the instruction may be executed by the respective database interfaces 22, 30; 24, 32; 26, 34; 28, 36; 66, 68.

Instructions from the server 16 to the call centers 12, 14 may involve and cause a change to the respective databases 23, 25, 27, 29, 31, 33, 35, 37, 63, 65, 67, 69 of the call center 12, 14 or may be a request for data from the database. Where the request is for data, the database interface 22, 30; 24, 32; 26, 34; 28, 36; 66, 68 may retrieve the requested data and compose a message to send the requested data back to the requester.

As the data message is returned, the message may arrive at the terminal adapter 18, 20 providing the original instruction. In response, the terminal adapter 18, 20 may reformat the data message into a format of the admin server 16.

Included within the admin server 16 may be one or more databases 46, 48, 50, 52, 72 that correspond to the applications 38, 40, 42, 44, 70. Under one illustrated embodiment, all or a portion of the data within the respective databases 23, 25, 27, 29, 31, 33, 35, 37, 67, 69 associated with the call centers 12, 14 may be substantially duplicated within respective databases 46, 48, 50, 52, 72 of the admin server 16. In this regard, data from WFM databases 23, 31 may be merged with the corresponding WFM database 46 to form a consolidated database of WFM information. Similarly, data from the CCM databases 25, 33 may be merged in CCM database 48, data from QMI databases 27, 35 may be merged in QMI database 50, data from DAP databases 29, 37 may be merged in DAP database 52 and data from the reporting databases 67, 69 may be merged in reporting database 72. This may be accomplished by the application 22, 30; 24, 32; 26, 34; 28, 36 associated with the database interfaces tracking and forwarding the changes or by the applications 38, 40, 42, 44 periodically requesting such data.

By having a duplicate of the data within the call centers 12, 14, the admin server 16 is able to control the overall allocation of resources within the call center system 11. For example, agents 54, 56 may be physically connected to call center 12 and agents 58, 60 may be physically connected to call center 14. However, agents 54, 56, 58, 60 may be shared by all call centers 12, 14. The sharing of agents among call centers 12, 14 is important because loading is not always equal among call centers. In addition, not all agents have equal skills. Agents 54, 56, 58, 60 with greater skills are often put to greater use when shared among a larger client base.

However, the design supports an embodiment where the database is not replicated in the admin server and instead, it relies upon the call center product databases to be the only persistent storage of their data.

Under one illustrated embodiment, the call center management application 40 may control agent assignment among the call centers 12, 14. In this case, the call management database 48 may receive or retrieve a list of available agents 54, 56, 58, 60 from each call center 12, 14 along with a list of agent qualifications. To control agent assignment, the call management application 40 may initially download an agent occupied flag to the call management database 25, 33 of each call center 12, 14 listing each agent 54, 56, 58, 60 as occupied by other calls.

As each call 62 is received at a call center (e.g., call center 12), the call management application 40 may detect the arrival of the call 62 via the creation of a call arrival file in the call management database 25 of the call center 12 and the forwarding of that file to the database 48 of the admin server 16. In response, the call management application 40 may compare the requirements of each call 62 with a list of agent skills in the database 48 and may select an agent (e.g., agent 54) to handle the call 62. Once the call management application 40 has selected the agent 54, the call management application 40 may download an instruction to clear the agent occupied flag for the agent 54. The instruction is transferred from the admin server 16 to the terminal adapter 18 where the instruction is mapped to the protocol used by the call center 12. The mapped instruction is then transferred to the call center management interface application 24 that, in turn, clears the agent occupied flag for the selected agent 54 within the database 25.

Since the other agents associated of the call center 12 were previously shown as occupied, the call management application 24 of call center 12 had been in a wait state for an available agent 54, 56 following arrival of the call 62. However, once the call management application 40 downloads the instruction to clear the agent occupied flag for agent 54, the call management application of the call center 12 would detect the availability of agent 54, select agent 54 and transfer the call to agent 54.

Once the call management application within the call center 12 has selected agent 54 to handle the call 62, the call management application of the call center 12 would again set the agent occupied flag for agent 54 within the database 25. The call management application 40 within the admin server 16 would detect the setting of this flag as confirmation of assignment of the call 62 to the agent 54.

Once the agent 54 had completed the call, the agent 54 would activate a call release softkey on his terminal 54. In response, the call management application within the call center 12 would detect activation of the softkey and clear the agent occupied flag for the agent 54.

The call management application 40 would detect clearing of the agent occupied flag for the agent 54 as indication that the agent 54 was again available. In response, the call management application 40 would again immediately send another instruction setting the agent occupied flag for agent 54 to the call center 12.

As another example, another call 62 may be received by the call center 12. Since all the agents 54, 56 are shown as previously occupied, the call management application within the call center 12 enters a wait state.

For this new call 62, the call management application 40 may detect the call and select agent 60 to handle the call. In this case, it may be assumed that the call centers 12, 14 contain a list of all agents 54, 56, 58, 60 and the ability to transfer calls among call centers 12, 14.

As a first step, the call management application 40 transfers an instruction to the call center 12 instructing the call center 12 to transfer the call 62 to the other call center 13. Alternatively, the call center 12 may have the ability to detect idle agents at the other call center 14 and transfer calls upon detection of an idle agent. In this situation, the call management application 40 transfers an instruction to the call center 14 clearing the agent occupied flag for the selected agent 60. The call management application of the first call center 12 detects the availability of agent 60 and transfers the call to the second call center 14. The second call center assigns the call to the agent 60 in a manner similar to the previous example.

Under another illustrated embodiment, an admin user 22 may access the workforce management application 38 within the admin server 16. By accessing the workforce management application 38, the user 22 can view the overall workforce status of the system of FIG. 1.

For example, on a first screen, the user 22 may view a list of agents 54, 56, 58, 60 logged into the system of FIG. 1. On another screen, the user can view the performance of each call center 12, 14. More specifically, the availability of data from the WFM database 23 allows the admin user 22 to view such performance statistics such as average delay to answer, the average call handling time, schedule adherence metrics, etc. By viewing performance statistics, such as call queues, the admin user 22 has the ability to determine whether the call centers 12, 14 are performing at an optimum level, are overloaded or are under utilized.

Moreover, where the admin user 22 should detect that a call center 12, 14 is overloaded, the admin user 22 may simply log onto the call center management application 40 and transfer agents. For example, if a first set of agents 54, 58 were assigned to a first agent group (group "A") and a second set of agents 56, 60 were assigned to a second agent group (group "B") and group A were overloaded, then the admin user 22 could reassign agents as needed. In this example, the admin user 22 would log into the call center management application 40 and select group B and delete agent 60. The admin user 22 may then select group A and add agent 60. In both cases, the deletion and addition steps would cause an instruction to be generated by the call center management application 40 that would be transferred to and executed by the call centers 12, 14.

In another embodiment, the admin user 22 may activate a quality management application 42. In this case, the admin user 22 may be presented with a screen where the user 22 can select agents 54, 56, 58, 60 to record for quality assurance purposes or where the user 22 can review previously made recordings of agents 54, 56, 58, 60. In the case where the user 22 wishes to designate an agent 54, 56, 58, 60 for recording, the user may enter an identifier of the agent 54, 56, 58, 60. Upon activating an ENTER softkey on the terminal 22, the quality management application 42 downloads an instruction to the quality management interface 26, 34 for entry of the identifier of the agent 54, 56, 58, 60 into a recording list within the quality management database 27, 35.

Alternatively, the instruction entered by the admin user 22 may have been a playback instruction. In this case, the quality management application 42 may simply retrieve the recording from the quality management database 50 and play the recording for the benefit of the user 22.

In another illustrated embodiment, the admin user 22 may access a data access protocol application 44. In this case, the admin user 22 may be presented with a screen where the user 22 may add or delete users or change access rights and privileges. For example, the user 22 may enter an identifier of an agent 54 and activate an ENTER softkey. In response, the data access protocol application 44 may present the admin user 22 with a screen of current access rights of the agent 54. The user 22 may amend the access rights or even delete the agent 54. In response, the data access protocol application 44 may generate an instruction that is forwarded to the data access protocol interface 28 saving the changes made by the admin user 22.

In another embodiment, the user 22 may access a list of call handling scripts located in a call management database 25, 33 of one of the call centers 12, 14. In this regard, each call handling script may define a set of steps for handling a contact received by the call centers 12, 14. For example, in the case where the call is a telephone call received through the PSTN, the call handling script may include the steps of retrieving DNIS and ANI information associated with the received call from the PSTN. The DNIS may be used for selecting an agent 54, 56, 58, 60 to handle the call. ANI may be used to identify the caller and to retrieve any records of past contacts with the caller for presentation to the agent selected to handle the call using a screen pop.

Upon accessing the list of call handling scripts, the user 22 may select and download a script. Once downloaded, the user 22 may modify the script by adding or deleting steps. For example, the user 22 may determine that calls from a particular geographic location may require selection of an agent fluent in Spanish. In order to accommodate this need, the user 22 may include a requirement that any agent selected to handle calls from this geographic origin be required to speak Spanish.

Alternatively, the user 22 may create a new script intended to initiate calls as part of a call campaign directed to a specific marketing objective. In this regard, the user 22 may incorporate by reference or may directly incorporate a list of telephone numbers of call targets. The user 22 may include a set of agent qualifications to handle each call of the call campaign. The user 22 may also create text to be read by the agent to the client as part of the call campaign. The user 22 may attach the text to the script and include the step of presenting the text to a selected agent as a screen pop when a call associated with the campaign is connected to an agent.

In either case, the user 22 may incorporate the new or modified script into a call routing file to be downloaded to one or more of the call centers 12, 14. It should be noted in this regard that the terminal adapters 18, 20 would be required to perform a number of additional steps with regard to scripts. The additional steps would be required, in this case, because the downloaded script would not be executed by the terminal adapter 18, 20, but that would still need to be converted into a form that would be understood by the call center management application 24, 32.

To download the file, the user 22 would enter an identifier of one or more target call centers 12, 14. In this case, the target adapter 18, 20 may receive the downloaded script and reference a set of mapping instructions 64 to convert from a script used by the call center management application 40 to a script that would be understandable by the call center management application 24, 32 of the call center 12, 14. Once converted, the converted script is downloaded to the appropriate call center 12, 14.

A specific embodiment of method and apparatus for controlling a group of dissimilar call centers has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of operating a plurality of dissimilar call centers that have different command and control structures comprising:
   providing an enterprise administration server coupled to the call centers using administrative interfaces of the call centers to read data from and write changes to databases of the call centers and functioning as a client of the administrative interfaces while allowing existing administrative tools of the call centers to work independently of the enterprise administration server;
   disposing a plurality of terminal adapters between the enterprise administration server and at least some of the plurality of dissimilar call centers such that each terminal adapter of the plurality of terminal adapters is coupled to a respective call center of the plurality of dissimilar call centers;
   a terminal adapter of the plurality of terminal adapters receiving a database instruction from the enterprise administration server;
   the terminal adapter mapping a database instruction between a protocol of the enterprise administration server and a protocol of the respective call center; and
   the respective call center executing the instruction such that the enterprise administration server controls the respective call center by changing database data in the respective call center to control the respective call center without replacing databases of any of the plurality of dissimilar call centers.

2. The method of operating the call centers as in claim 1 further comprising coupling the enterprise administration server to at least some of the plurality of dissimilar call centers through the Internet using a secure socket layer to encrypt exchanges.

3. The method of operating the call centers as in claim 1 wherein the executed instruction further comprises a request for data from the call center.

4. The method of operating the call centers as in claim 3 wherein the requested data further comprises reporting application data from the call center and workforce management data.

5. The method of operating the call centers as in claim 1 further comprising the enterprise administration server downloading to the plurality of the call centers an agent occupied flag for each agent of each call center to list each agent as occupied, detecting arrival of a call at a receiving call center of the plurality of the call centers, the enterprise administration server selecting an agent to handle the call, and downloading an instruction from the enterprise administration server to the receiving call center to clear the agent occupied flag for the selected agent to allow assignment of the selected agent to the call by the receiving call center.

6. The method of operating the call centers as in claim 4 wherein the workforce management data further comprises at least some of the group consisting of agents logged in, identifiers of agent groups and an identifier of each agent assigned to each of the identified agent groups.

7. The method of operating the call centers as in claim 4 further comprising merging data received from the plurality of dissimilar call centers by data type and source into a database of the enterprise administration server.

8. The method of operating the call centers as in claim 7 wherein the data type further comprises at least some of the group consisting of calls per hour, abandoned calls, average call handling time, average time in queue, agents logged in, identifiers of agent groups and an identifier of each agent assigned to each of the identified agent groups.

9. The method of operating the call centers as in claim 1 wherein the enterprise administration server further comprises a website for accessing the databases of the respective call centers of the plurality of dissimilar call centers.

10. The method of operating the call centers as in claim 9 wherein the website further comprises a plurality of applications for accessing consolidated data within the database.

11. The method of operating the call centers as in claim 10 wherein the plurality of applications further comprise an application selected from the group consisting of a reporting application, a workforce management application, a call control application, a quality management application and a data access protocol application.

12. The method of operating the call centers as in claim 1 wherein the executed instruction further comprises a request for a call routing script from the call center.

13. The method of operating the call centers as in claim 12 further comprising modifying the call routing script and downloading the modified call routing script to the call center.

14. The method of operating the call centers as in claim 1 wherein the executed instruction further comprises a reassignment of an agent among call groups within the call center.

15. Apparatus for operating a plurality of dissimilar call centers having different command and control structures comprising:
  means for providing enterprise administration coupled to the call centers using administrative interfaces of the call centers to read data from and write changes to databases of the call centers to function as a client of administrative interfaces of the call centers while allowing existing administrative tools of the call centers to work independently of the enterprise administration server;
  a plurality of terminal adapters disposed between the enterprise administration means and at least some of the plurality of dissimilar call centers such that each terminal adapter of the plurality of terminal adapters is coupled to a respective call center of the plurality of dissimilar call centers;
  means within each terminal adapter of the plurality of terminal adapters for mapping a database instruction between a protocol of the enterprise administration means and a protocol of the respective call center; and
  means within each respective call center for executing the instruction such that the enterprise administration means controls the respective call center by changing database data in the respective call center to control the respective call center without replacing databases of any of the plurality of dissimilar call centers.

16. The apparatus for operating the call centers as in claim 15 further comprising means for coupling the enterprise administration server to at least some of the plurality of dissimilar call centers through the Internet using a secure socket layer to encrypt exchanges.

17. The apparatus for operating the call centers as in claim 15 wherein the executed instruction further comprises a request for data from the call center.

18. The apparatus for operating the call centers as in claim 17 wherein the requested data further comprises reporting application data from the call center.

19. The apparatus for operating the call centers as in claim 18 wherein the requested data further comprises a request for workforce management data.

20. The apparatus for operating the call centers as in claim 19 wherein the workforce management data further comprises at least some of the group consisting of agents logged in, identifiers of agent groups and an identifier of each agent assigned to each of the identified agent groups.

21. The apparatus for operating the call centers as in claim 18 further comprising merging data received from the plurality of dissimilar call centers by data type and source into a database of the enterprise administration server.

22. The apparatus for operating the call centers as in claim 21 wherein the data type further comprises at least some of the group consisting of calls per hour, abandoned calls, average call handling time, average time in queue, agents logged in, identifiers of agent groups and an identifier of each agent assigned to each of the identified agent groups.

23. The apparatus for operating the call centers as in claim 15 wherein the enterprise administration server further comprises a website for accessing the databases of the respective call centers of the plurality of dissimilar call centers.

24. The apparatus for operating the call centers as in claim 23 wherein the website further comprises a plurality of applications for accessing the consolidate data within the database.

25. The apparatus for operating the call centers as in claim 24 wherein the plurality of applications further comprise an application selected from the group consisting of a reporting application, a workforce management application, a call control application, a quality management application and a data access protocol application.

26. The apparatus for operating the call centers as in claim 15 wherein the executed instruction further comprises a request for a call routing script from the call center.

27. The apparatus for operating the call centers as in claim 26 further comprising further comprising means for modifying the call routing scrip and downloading the modified call routing script to the call center.

28. The apparatus for operating the call centers as in claim 15 wherein the executed instruction further comprises a reassignment of an agent among call groups within the call center.

29. Apparatus for operating a plurality of dissimilar call centers having different command and control protocols comprising:
  an enterprise administration server coupled to the call centers using administrative interfaces of the call centers to read data from and write changes to databases of the call centers and functioning as a client of the administrative interfaces while allowing existing administrative tools of the call centers to work independently of the enterprise administration server;
  a plurality of terminal adapters disposed between the enterprise administration server and at least some of the plurality of dissimilar call centers such that each terminal adapter of the plurality of terminal adapters is coupled to a respective call center of the plurality of call centers;
  a mapping processor within each of the terminal adapters that maps a database instruction between a protocol of the enterprise administration server and a protocol of the respective call center; and a respective administrative interface application within each of the call centers for executing the instruction such that the enterprise administration server controls the respective call center by changing database data of the respective call center to control the respective call center without requiring replacement of databases of any of the plurality of dissimilar call centers.

30. The apparatus for operating the call centers as in claim 29 wherein the executed instruction further comprises a request for data from the call center.

31. The apparatus for operating the call centers as in claim 30 wherein the requested data further comprises reporting application data from the call center.

32. The apparatus for operating the call centers as in claim 31 wherein the requested data further comprises a request for workforce management data.

33. The apparatus for operating the call centers as in claim 32 wherein the workforce management data further comprises at least some of the group consisting of agents logged in, identifiers of agent groups and an identifier of each agent assigned to each of the identified agent groups.

34. The apparatus for operating the call centers as in claim 31 further comprising merging data received from the plurality of dissimilar call centers by data type and source into a database of the enterprise administration server.

35. The apparatus for operating the call centers as in claim 34 wherein the data type further comprises at least some of the group consisting of calls per hour, abandoned calls, average call handling time, average time in queue, agents logged in, identifiers of agent groups and an identifier of each agent assigned to each of the identified agent groups.

36. The apparatus for operating the call centers as in claim 29 wherein the enterprise administration server further comprises a website for accessing the databases of the respective call centers of the plurality of dissimilar call centers.

37. The apparatus for operating the call centers as in claim 36 wherein the website further comprises a plurality of applications for accessing the consolidate data within the database.

38. The apparatus for operating the call centers as in claim 37 wherein the plurality of applications further comprise an application selected from the group consisting of a reporting application, a workforce management application, a call control application, a quality management application and a data access protocol application.

39. The apparatus for operating the call centers as in claim 29 wherein the executed instruction further comprises a request for a call routing script from the call center.

40. The apparatus for operating the call centers as in claim 39 further comprising further comprising a set of mapping instructions that modify the call routing script and download the modified call routing script to the call center.

41. The apparatus for operating the call centers as in claim 29 wherein the executed instruction further comprises a reassignment of an agent among call groups within the call center.

* * * * *